(12) United States Patent
Wilhelm

(10) Patent No.: US 7,228,869 B2
(45) Date of Patent: Jun. 12, 2007

(54) PRESSURE LIMITING VALVE

(75) Inventor: Michael Wilhelm, Vaihingen/Enz (DE)

(73) Assignee: Bosch Rexroth AG, Stuttgart (DE)

( * ) Notice: Subject to any disclaimer, the term of this patent is extended or adjusted under 35 U.S.C. 154(b) by 47 days.

(21) Appl. No.: 10/530,675

(22) PCT Filed: Oct. 7, 2003

(86) PCT No.: PCT/DE03/03318

§ 371 (c)(1),
(2), (4) Date: May 23, 2005

(87) PCT Pub. No.: WO2004/033943

PCT Pub. Date: Apr. 22, 2004

(65) Prior Publication Data

US 2006/0037646 A1    Feb. 23, 2006

(30) Foreign Application Priority Data

Oct. 8, 2002   (DE) ............................... 102 46 787

(51) Int. Cl.
*F16K 17/04*    (2006.01)
*F16K 21/10*    (2006.01)

(52) U.S. Cl. ............... 137/514.3; 137/514; 137/540

(58) Field of Classification Search ............... 137/514, 137/514.3, 514.5, 540
See application file for complete search history.

(56) References Cited

U.S. PATENT DOCUMENTS

| 867,702 | A | * | 10/1907 | Clarke | ...................... 137/514.5 |
|---|---|---|---|---|---|
| 2,941,629 | A | * | 6/1960 | Etienne | ...................... 188/320 |
| 3,099,999 | A | * | 8/1963 | Vismara | ................ 137/543.23 |
| 4,252,141 | A | * | 2/1981 | Burgdorf et al. | ............ 137/101 |
| 4,361,280 | A | * | 11/1982 | Rosenberg | ................... 239/76 |
| 4,616,672 | A |   | 10/1986 | Schmidt | |
| 5,129,419 | A | * | 7/1992 | Stapleton | ................. 137/514.3 |
| 5,871,109 | A |   | 2/1999 | Litten | |
| 6,532,987 | B1 | * | 3/2003 | Itoh et al. | ................ 137/514.5 |

FOREIGN PATENT DOCUMENTS

| DE | 37 10 863 A1 | 10/1988 |
|---|---|---|
| DE | 40 33 301 A1 | 4/1992 |
| DE | 100 06 620 A1 | 8/2001 |
| FR | 2.083.655 | 12/1971 |
| FR | 2 264 462 | 10/1975 |
| GB | 694662 | 7/1953 |
| WO | WO 01/51835 A1 | 7/2001 |

* cited by examiner

*Primary Examiner*—Ramesh Krishnamurthy
(74) *Attorney, Agent, or Firm*—Oliff & Berridge, PLC

(57) ABSTRACT

What is disclosed is a a pressure limiting valve comprising a valve body, the axial movement of which is damped by means of a damping device. In accordance with the invention, the damping device includes a damping chamber formed on the return side, that is subjected to the system pressure acting on a pressure port.

10 Claims, 1 Drawing Sheet

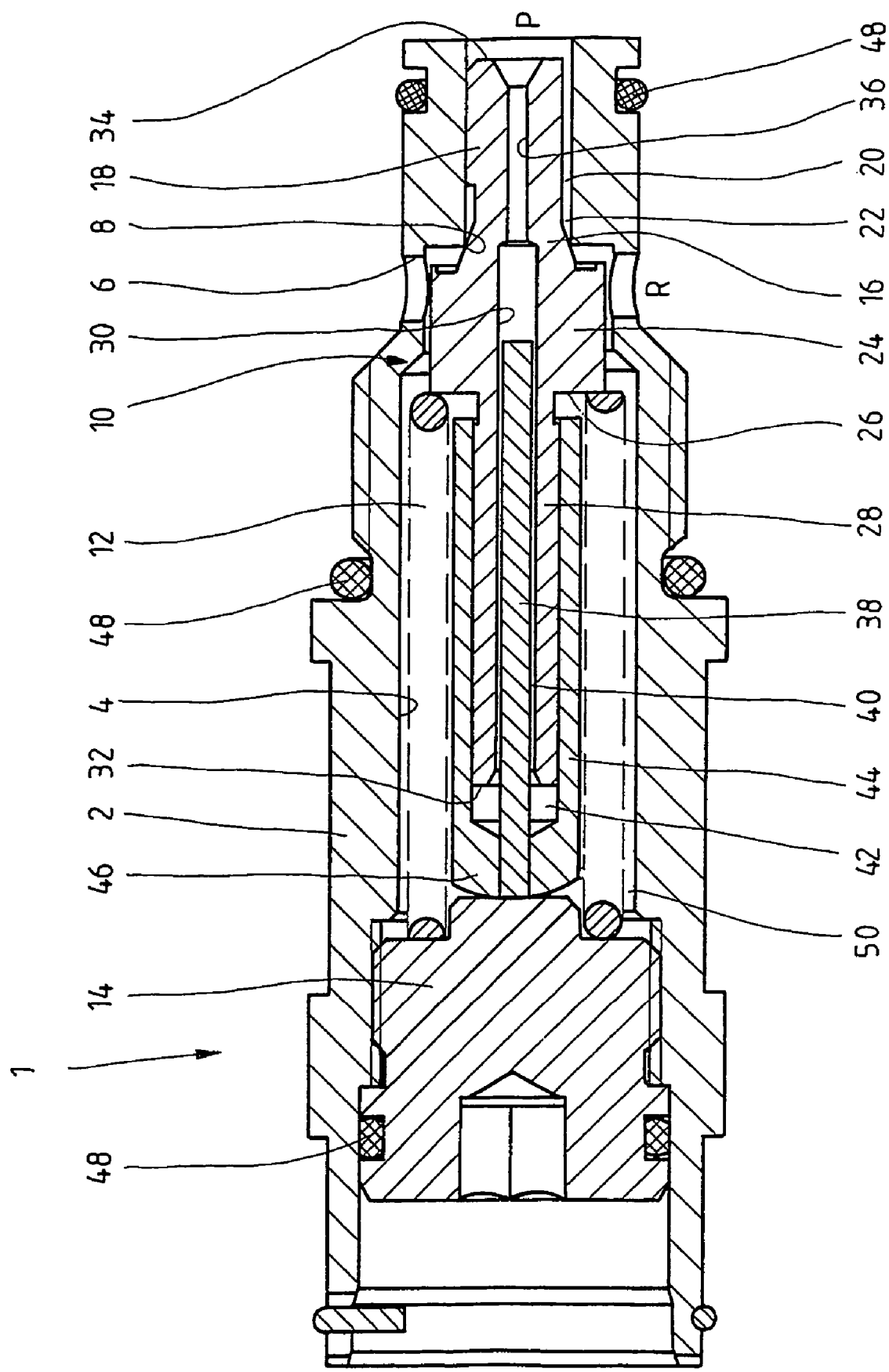

PRESSURE LIMITING VALVE

INTRODUCTION

The invention relates to a pressure limiting valve in accordance with the preamble of claim 1.

BACKGROUND

Pressure limiting valves serve to limit a system pressure. They may have the form of directly controlled seat valves. Other designs are spool valves or disk valves. These, too, may fundamentally be vibrationally damped by the kind of damping presently applied, if they are controlled directly. Furthermore the piloted design is also possible. When a pre-set maximum pressure is exceeded, a connection from a pressure port to a return port is opened via the pressure limiting valve. In the most simple case the pressure limiting valves are controlled directly and thus have a simple construction and may be manufactured at low cost. Such directly controlled pressure limiting valves have high opening dynamics, so that pressure peaks in the system may be reduced very rapidly. It is one drawback of these pressure limiting valves, however, that they are very prone to vibration due to their opening dynamics in the event of pressure fluctuations. The valve bodies, which vibrate owing to hydraulic excitation, may result in a considerable acoustic load, and in unfavorable cases in the destruction of an associated valve seat or of the spring acting in the closing direction.

In order to attenuate these vibrations, pressure limiting valves are provided with damping means as described, e.g., in Bosch-Rexroth data sheet RC 25 402/08.97.

In this known solution, there is associated to the valve body on the pressure port side a damping piston which defines, jointly with a damping sleeve applied on the end side, a damping gap whereby a damping chamber is connected with a valve seat-side space. In the event of axial movements of the valve body, the volume of the damping chamber is modified so that pressure medium must flow out from it or into it. This pressure medium volume balance is impaired by the throttle effect in the damping gap, with kinetic energy of the valve body and of the damping piston being converted into heat, and the axial translation of the valve body thus being decelerated and damped.

It is a drawback in this known solution that the axial structural space of the pressure limiting valve is increased by the damping chamber connected on the pressure port side and having the damping piston arranged in it. Moreover a comparative technological complexity is necessary in the manufacture, for the pressure port has to be formed by oblique bores that are difficult to produce.

As an alternative solution it is also possible to provide not a pressure port-side damping device but a return-side damping device, wherein a damping chamber is filled with pressure medium and connected with the return port via the damping gap. In the event of axial translations of a damping piston that is connected with the valve body, pressure medium is displaced via the damping gap from the damping chamber or into the latter, so that the axial movements of the valve body are damped.

It is a drawback in this return-side low-pressure damping that 100% filling of the damping chamber with pressure medium must always be ensured. This filling may only be carried out with comparative complexity during installation of the valve. If air bubbles remain in the damping chamber, they deactivate this damping. Owing to the connection with the return port, an entry of air through the damping gap can not be excluded. This risk is particularly high if the return line is capable of being emptied entirely, or if air dissolved in the pressure medium bubbles out in the transition from high pressure to low pressure.

SUMMARY OF INVENTION

In contrast, the invention is based on the object of furnishing a pressure limiting valve in which the damping effect is enhanced.

This object is achieved through a pressure limiting valve having the features of claim 1.

In accordance with the invention, the pressure limiting valve has a damping chamber which is formed on the return side and subjected to high pressure, i.e., e.g., the pressure at the pressure port. Return-side damping chamber here is understood to designate a damping chamber arranged in the range of a bush of the pressure limiting valve that is removed from the pressure port.

The solution of the invention has the advantage that additional axial structural space need not be made available for the damping chamber, so that the pressure limiting valve may be designed with a reduced length in comparison with the solution described at the outset, that involves high pressure damping. It is another advantage that inasmuch as the damping chamber is subjected to high pressure, the risk of a formation of air bubbles in the damping chamber is reduced considerably in comparison with the above described low-pressure damping, so that a reliable damping effect is ensured.

The pressure limiting valve of the invention may be mounted very easily, for thanks to the connection of the damping chamber to the pressure port, filling of the damping chamber is very simple, and bleeding of the damping chamber need not be provided.

In a preferred embodiment of the invention, the damping chamber is formed coaxial with a spring chamber accommodating a closing spring, so that the radial structural space of the pressure limiting valve is also minimum.

Here it is preferred if the damping piston extends in portions thereof through an axial bore of the valve body, which opens into the damping chamber on the one hand and into a pressure port-side end face of the valve body on the other hand. In other words, in this embodiment the damping piston extends through the valve body at least in portions thereof, so that the pressure limiting valve may be designed with a very short length.

The structure may be further simplified if one end portion of the valve body sealingly plunges into a damping sleeve through which in turn the damping piston extends, and which on the end side and radially defines the damping chamber jointly with the adjacent end face of the valve body.

In this variant, it is preferred if the valve body has a radially recessed return-side axial protrusion which plunges into the damping sleeve.

Advantageously the damping piston extends through a bottom of the damping sleeve, with damping sleeve and damping piston being supported on a set screw, the screw-in depth of which into a bush of the pressure limiting valve is variable.

In one preferred embodiment, the closing spring acting on the valve body in the closing direction encompasses the damping sleeve and is equally supported on the set screw.

The valve body has at its pressure port-side end portion a radially recessed pin which serves for axially guiding the valve body. In this pin the axial bore emerges, whereby the pressure medium supply to the damping chamber is ensured. In this pin longitudinal grooves are formed whereby pressure medium is conducted from the pressure port to the valve seat.

Further advantageous developments of the invention are subject matter of the other subclaims.

Hereinafter a preferred embodiment of the invention shall be explained in more detail by referring to a schematic drawing.

BRIEF DESCRIPTION OF DRAWINGS

The single drawing shows a longitudinal sectional view through a pressure limiting valve of the invention.

DETAILED DESCRIPTION OF INVENTION

The pressure limiting valve 1 comprises a bush 2, the valve bore 4 of which is stepped back from left to right in the representation. The right-hand end-side opening of the valve bore 4 forms a pressure port P, whereas a return port R is formed by a configuration of radially arranged bores 6 radially opening into the valve bore 4.

In the range between the return port R and the pressure port P, a radial step of the valve bore 4 forms a valve seat 8 against which a valve body 10 is biased through the intermediary of a closing spring 12.

The left-hand end portion of the valve bore 4 in the representation of the FIGURE is closed by a set screw 14 screwed into a radially expanded portion of the valve bore 4. The closing spring 12 is supported on the set screw 14, so that the bias of the closing spring 12 and thus the adjustable maximum system pressure is variable by modifying the screw-in depth.

The represented valve body 10 has a valve cone 16 which is seated on the valve seat 8 and continues into a front-side pin 18. On the outer circumference of this pin, a multiplicity of longitudinal grooves 20 are formed, whereby the pressure port P is hydraulically connected with a valve seat-side pressure chamber 22.

The left-hand end portion of the valve cone 16 in the FIG. connects into a radial shoulder in a collar 24, on the rear annular surface 26 of which the closing spring 12 attacks.

Via this annular surface 26 the valve body 10 is stepped back into a return-side axial protrusion 28. The valve body 10 is penetrated by an axial bore 30 which opens into the left-hand annular end face 32 of the axial protrusion 28 on the one hand and into the end face 34 of the pinion 18 on the other hand. In the range of the pin 18, the axial bore 30 is radially stepped back into an end portion 36 which opens in a funnel shape into the end face 34.

On the set screw 14 there is moreover supported a damping piston 38, the free end portion of which plunges into the axial bore 30. The play between the damping piston 38 that is fixedly supported on the housing and the axial bore 30 is adapted such that a damping gap 40 is formed which permits a throttled pressure medium flow between the right-hand pressure port-side section of the axial bore 30 and a rear-side damping chamber 42. The radial and left-hand end-face limitation of the pressure chamber 42 is achieved by a damping sleeve 44 into which the axial protrusion 28 of the valve body 10 sealingly plunges. The damping sleeve 44 is supported via a bottom 46 on the set screw 14, with the damping piston 38 extending through the bottom 46. Thus the damping chamber 42 is connected via the damping gap 44 and the right-hand part of the axial bore 30 and the end portion 36 thereof to the pressure port P, so that this damping chamber 42 is subjected to high pressure. Upon an opening movement of the valve body 10, the volume of the damping chamber 42 is reduced, so that pressure medium must flow via the damping gap 40 towards the pressure port P in order to allow an axial displacement of the valve body 10.

This pressure medium flow is obstructed by the throttle effect in the damping gap, so that the opening movement of the valve body 10 is damped. Upon a return movement of the valve body 10 in the closing direction, pressure medium is correspondingly conveyed back from the pressure port P into the damping chamber 42, so that the closing movement equally takes place in a throttled manner. The particular advantage of this solution resides in the fact that on the one hand only a minimum axial and radial structural space for the damping device is necessary, as the spring chamber 50, which in any case is provided, is utilized for receiving the damping device. As the damping chamber 42 is permanently subjected to a high pressure, entry of air during the operation of the pressure limiting valve may virtually be excluded. Another advantage of the construction in accordance with the invention must be seen in the fact that because the annular end face 32 of the valve body 10 is subjected to high pressure, a compression force component acts in the closing direction, so that thanks to the partial pressure compensation it is possible to design the closing spring 12 with a lower spring rate than in conventional solutions. Hereby a more favorable, flatter characteristic spring line is achieved.

In order to seal the bush 2 in a housing, a plurality of O-ring seals 48 are arranged at its outer circumference and at the outer circumference of the set screw 14.

In the above described embodiment, the pressure port is connected via the longitudinal grooves 20 on the pin 18 with the valve seat 8. As an alternative it might also be possible to form the pressure port P through the intermediary of oblique bores of the bush 2.

What is disclosed is a a pressure limiting valve comprising a valve body, the axial movement of which is damped by means of a damping device. In accordance with the invention, the damping device includes a damping chamber formed on the return side, that is subjected to the system pressure acting on a pressure port.

LIST OF REFERENCE SYMBOLS 1 pressure limiting valve
2 bush
4 valve bore
6 radially arranged bores
8 valve seat
10 valve body
12 closing spring
14 set screw
16 valve cone
18 pinion
20 longitudinal groove
22 pressure chamber
24 collar
26 annular surface
28 axial protrusion
30 axial bore
32 annular end face
34 end face
36 end portion
38 damping piston
40 damping gap
42 damping chamber
44 damping sleeve 46 bottom
48 O-ring seal
50 spring chamber

The invention claimed is:

1. Pressure limiting valve, comprising a valve body biased into a closed position, whereby a connection between a pressure port and a return port may be controlled open, and to which a damping device which includes a damping piston defining a damping chamber is associated for damping the valve body movement, characterized in that the damping chamber is formed on the return side and connected with the pressure port;
   wherein the damping chamber is formed coaxial with a spring chamber accommodating a closing spring,
   wherein the damping piston extends in portions thereof through an axial bore of the valve body, that opens into the damping chamber on the one hand and into a pressure port-side end face of the valve body on the other side,
   wherein the valve body sealingly plunges into a damping sleeve through which the damping piston extends in portions thereof, and which forms an end-side termination of the damping chamber, and
   wherein the valve body includes a radially recessed, return-aside axial protrusion which plunges into the damping sleeve.

2. The pressure limiting valve in accordance with claim 1, wherein the damping piston extends through a bottom of the damping sleeve.

3. The pressure limiting valve in accordance with claim 1, wherein the closing spring encompasses the damping sleeve.

4. The pressure limiting valve in accordance with claim 1, wherein the valve body includes a pressure port-side, radially recessed pin, in the range of which the axial bore is stepped back.

5. The pressure limiting valve in accordance with claim 4, wherein the pin has at its outer circumference longitudinal grooves where by the pressure port is hydraulically connected with the valve seat.

6. The pressure limiting valve in accordance with claim 2, wherein the closing spring encompasses the damping sleeve.

7. A pressure limiting valve, comprising a valve body biased into a closed position, whereby a connection between a pressure port and a return port may be controlled open, and to which a damping device which includes a damping piston defining a damping chamber is associated for damping the valve body movement, characterized in that the damping chamber is formed on the return side and connected with the pressure port,
   wherein the damping chamber is formed coaxial with a spring chamber accommodating a closing spring,
   wherein the damping piston extends in portions thereof through an axial bore of the valve body, that opens into the damping chamber on the one hand and into a pressure port-side end face of the valve body on the other side,
   wherein the valve body sealingly plunges into a damping sleeve through which the damping piston extends in portions thereof, and which forms an end-side termination of the damping chamber, and
   wherein the damping sleeve and/or the damping piston are supported on a set screw.

8. The pressure limiting valve in accordance with claim 7, wherein the valve body includes a pressure port-side radially recessed pin, in the range of which the axial bore is stepped back.

9. The pressure limiting valve in accordance with claim 8, wherein the pin has at its outer circumference longitudinal grooves whereby the pressure port is hydraulically connected with the valve seat.

10. The pressure limiting valve in accordance with claim 7, wherein the closing spring encompasses the damping sleeve.

* * * * *